(12) United States Patent
Boren et al.

(10) Patent No.: US 11,815,060 B2
(45) Date of Patent: Nov. 14, 2023

(54) FLEXIBLE WAVE ENERGY CONVERTER

(71) Applicant: Alliance for Sustainable Energy, LLC, Golden, CO (US)

(72) Inventors: Blake Craig Boren, Corvallis, OR (US); Jochem Weber, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 17/851,418

(22) Filed: Jun. 28, 2022

(65) Prior Publication Data

US 2022/0403811 A1  Dec. 22, 2022

Related U.S. Application Data

(63) Continuation of application No. 16/997,455, filed on Aug. 19, 2020, now Pat. No. 11,401,910.

(60) Provisional application No. 62/888,685, filed on Aug. 19, 2019.

(51) Int. Cl.
   *F03B 13/18*   (2006.01)

(52) U.S. Cl.
   CPC .................. *F03B 13/188* (2013.01)

(58) Field of Classification Search
   CPC .................................................. F03B 13/188
   See application file for complete search history.

(56) References Cited

U.S. PATENT DOCUMENTS

| | | | |
|---|---|---|---|
| 6,927,528 B2 | 8/2005 | Barillot et al. | |
| 7,633,175 B1 | 12/2009 | Wilson, III et al. | |
| 8,633,608 B2 | 1/2014 | Grey et al. | |
| 11,401,910 B2 | 8/2022 | Boren et al. | |
| 2007/0257490 A1* | 11/2007 | Kornbluh | F03B 13/20 290/53 |
| 2009/0305364 A1 | 12/2009 | Burgard et al. | |
| 2011/0006532 A1 | 1/2011 | Grey et al. | |
| 2012/0228877 A1* | 9/2012 | Samuel | F03B 13/00 310/26 |
| 2015/0214862 A1* | 7/2015 | Dakhil | F03B 13/20 416/146 R |
| 2016/0040648 A1* | 2/2016 | Wang | H02H 1/04 290/42 |
| 2018/0351480 A1 | 12/2018 | Ahmad et al. | |

OTHER PUBLICATIONS

Handbook of Ocean Wave Energy, Ocean Engineering & Oceanography, vol. 7, Edited by Arthur Pecher and Jens Peter Kofoed, Springer Open, 2017, pp. 1-305.

Wave Energy Converter, SBM Offshore brochure, 2019, pp. 1-2.

(Continued)

*Primary Examiner* — Viet P Nguyen
(74) *Attorney, Agent, or Firm* — Alexandra M. Hall

(57) ABSTRACT

Disclosed herein are flexible wave energy converters that actuate electrical generators with dynamic strain (e.g., flexing, stretching, twisting, distension) to convert wave energy to electrical energy. The flexible wave energy converter utilizes flexible electric generators embedded throughout the wave-energy converter's flexible body.

8 Claims, 7 Drawing Sheets

(56) References Cited

OTHER PUBLICATIONS

Babarit et al., "Hydro-Elastic Modelling of an Electro-Active Wave Energy Converter", Proceedings of the ASME 2013 32nd International Conference on Ocean, Offshore and Artic Engineering, OMAE2013-10848, Jun. 9-14, 2013, Nantes, France, pp. 1-9.

Babarit et al., "Investigation on the energy absorption performance of a fixed-bottom pressure-differential wave energy converter", Preprint submitted to Applied Ocean Research, Mar. 16, 2017, HAL archives-ouvertes.fr, pp. 1-28.

Boren, "Active Power Redistribution and Shape Control", Mar. 28, 2020, p. 1.

Coxworth, "Simpler, cheaper renewable energy system uses waves to inflate rubber", Feb. 13, 2019, accessed Aug. 18, 2020 at https://newatlas.com/dielectric-elastomer-generator-wave-power/58465, pp. 1-8.

Estrada, "Applications of Magnetostrictive Materials in the Real-Time Monitoring of Vehicle Suspension Components", Submitted to the Graduate School of The University of Texas-Pan American In partial fulfillment of the requirements for the degree of Master of Science, Dec. 2014, pp. 1-122.

Graf et al., "Energy harvesting cycles based on electro active polymers", Proceedings of SPIE, SPIE Smart Structures and Materials + Nondestructive Evaluation and Health Monitoring, 2010, San Diego, California, vol. 7642, pp. 764217-1-764217-12.

Kurniawan et al., "Wave energy devices with compressible volumes", Proceedings of the Royal Society A, 2014, vol. 470, No. 20140559, pp. 1-23.

Moretti et al., "Resonant wave energy harvester based on dielectric elastomer generator", Smart Materials and Structures, 2018, vol. 27, pp. 1-14.

\* cited by examiner

FLEXIBLE WAVE ENERGY CONVERTER

CROSS-REFERENCE TO RELATED APPLICATIONS

This application claims the benefit of U.S. Provisional Application No. 62/888,685 filed on Aug. 19, 2019, the contents of which are incorporated herein by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Most ocean wave energy converters are based upon rigid body dynamics. Ocean wave energy is harvested by rigid bodies and then transmuted into a central electric generator (or other singular power take-off system). As a result, rigid wave energy converters are typically only designed for, and optimized towards, a subset of ocean wave environments, thereby limiting their ability to harvest all sources of wave energy at any given moment. Likewise, due to the centric nature of a rigid-body wave energy converter's electric generator or power take-off system, any failures with the generator itself, or with its corresponding rigid bodies, means the converter will literally be dead in the water (i.e., not fulfilling its purpose, likely wasting significant sums of money due to needed maintenance and down time, and generally not be operational).

SUMMARY

An aspect of the present disclosure is a device comprising a body having a first side, a second side, and a base, and the body comprises a flexible material and a plurality of elastomer generators. In some embodiments, the plurality of elastomer generators comprises an ionic dielectric elastomer generator, a layered reinforced dielectric elastomer generator, and a structural reinforcement, wherein the structural reinforcement has a first surface and a second surface, the ionic dielectric elastomer generator is in contact with the first surface, the layered reinforced dielectric elastomer generator is in contact with the second surface, and the plurality of elastomer generators are located within the body. In some embodiments, the structural reinforcement is carbon fiber. In some embodiments, the flexible material further comprises a polymer, and the plurality of elastomer generators are implanted within the polymer. In some embodiments, a fin attached to the first side. In some embodiments, the body is configured to receive a stress, the stress compresses the first side, resulting in a compressed first side, the stress stretches the second side, resulting in a stretched second side, and the compressed first side and the stretched second side stretch and compress the plurality of elastomer generators, resulting in a generation of electrical current.

An aspect of the present disclosure is a device comprising a shell having an interior and an exterior, a lattice comprising a plurality of elastomer generators in the interior, and a weight. In some embodiments, the plurality of elastomer generators comprises an ionic dielectric elastomer generator, a layered reinforced dielectric elastomer generator, and a structural reinforcement, wherein the structural reinforcement has a first surface and a second surface, the ionic dielectric elastomer generator is in contact with the first surface, and the layered reinforced dielectric elastomer generator is in contact with the second surface. In some embodiments, the lattice comprises a plurality of polyhedral cells, and the plurality of elastomer generators are configured to form the plurality of polyhedral cells. In some embodiments, the weight is configured to apply a strain to the plurality of elastomer generators when the device is subjected to a stress, the strain to the plurality of elastomer generators results in a generation of electrical energy.

An aspect of the present disclosure is a device comprising a rod having a first end, a second end, a first magnetic field, and a length, a tube surrounding the first end, the second end, and the length of the rod, a first mooring line connected to the first end of the rod, and a second mooring line connected to the second end of the rod, wherein the first mooring line is also connected to a base, the second mooring line is connected to the base, and the rod comprises a magnetostrictive material. In some embodiments, a coil is configured to be oriented concentrically with the rod and to encircle the length of the rod within the tube. In some embodiments, the coil comprises an electrically conductive material. In some embodiments, the device is configured to flex when subjected to force, thereby creating a tension in the rod, and convert the tension to electrical energy. In some embodiments, the tension is created by the first mooring line and the second mooring line. In some embodiments, the tension causes the rod to move relative to the coil, resulting in a strain on the rod, the strain on the rod changes the first magnetic field to a second magnetic field, and the change to the second magnetic field induces an electrical current in the coil.

BRIEF DESCRIPTION OF THE DRAWINGS

FIG. 1A shows the flexible wave energy converter moving laterally, while FIG. 1B shows the flexible wave energy converter moving rotationally.

DETAILED DESCRIPTION

Figure 1A:
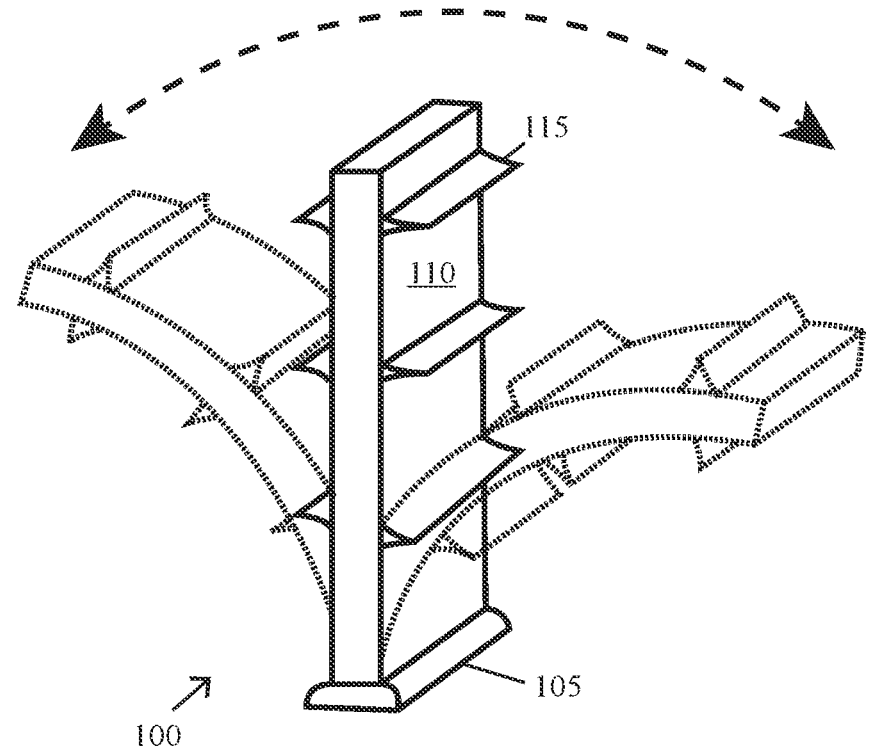
FIGS. 1A and 1B illustrate a flexible wave energy converter according to some embodiments of the present disclosure.

Disclosed herein are systems and devices for converting ocean (or wave) energy into useful electrical energy using flexible electrical generators, known as elastomer generators. A flexible structure formed by and/or embedded with elastomer generators will actively deform (i.e., bend, contort, stretch) when subjected to ocean energy. The deformation of the flexible structure is dampened by the elastomer generators, which act as distributed power take off systems, taking structural deformation as input and generating electricity as an output. As described herein, the wave energy converters experience structural deformation induced by ocean energy and the distributed power take-off system resists the deformation by generating electricity. The use of flexible structures and materials overcomes many issues traditional wave energy converters have and allows for continued operation even if some components of the wave energy converter fail.

In some embodiments, the present disclosure utilizes dielectric elastomer generators embedded within a flexible structure (or, in some embodiments, a flexible structure formed by dielectric elastomer generators) to convert ocean energy into electrical energy by dampening the ocean energy induced structural deformations of the flexible structure. Multiple embodiments are described herein, each utilizing generators embedded within and/or making up flexible materials to convert wave energy into electrical energy. The elastomer generators may be arranged in layered configurations or geometric shapes of electro-active polymers, creating a flexible material with distributed power take-off capabilities.

Flexible wave energy converters as described herein overcome many issues relating to rigid body ocean wave energy converters, by inherently being a flexible structure in operation and being redundant in the manner of electricity generation. In some embodiments, flexible wave energy converters as described herein may be designed to undergo some form of dynamic strain (flexing, stretching, twisting, distension, etc.) exerted by any type of wave environment at any time. The utilization of discretized flexible electric generators placed throughout the structure itself means automatic redundancy for electricity generation (i.e., if some electric generators fail, others will still be operational).

The flexible wave energy converters described herein convert portions of elastomer generator's dynamic strain energy (structural flexing, stretching, etc.) into electricity. The elastomer generators may be dielectric elastomer generators, ionic dielectric elastomer generators, magnetostrictive generators, and/or a combination of flexible generators. Dielectric elastomer generators are embeddable energy converters whose power take off schemes are based upon a dynamically stretched capacitor. The flexible wave energy converter's underlying structure is inherently flexible while also being sufficiently robust to endure ocean wave environments. Materials for the flexible wave energy converter's underlying structure, may be any number of synthetic polymers meshed with or reinforced by composites (e.g. neoprene, fiberglass, polyurethane, Buna-N, etc.).

Figure 1B:
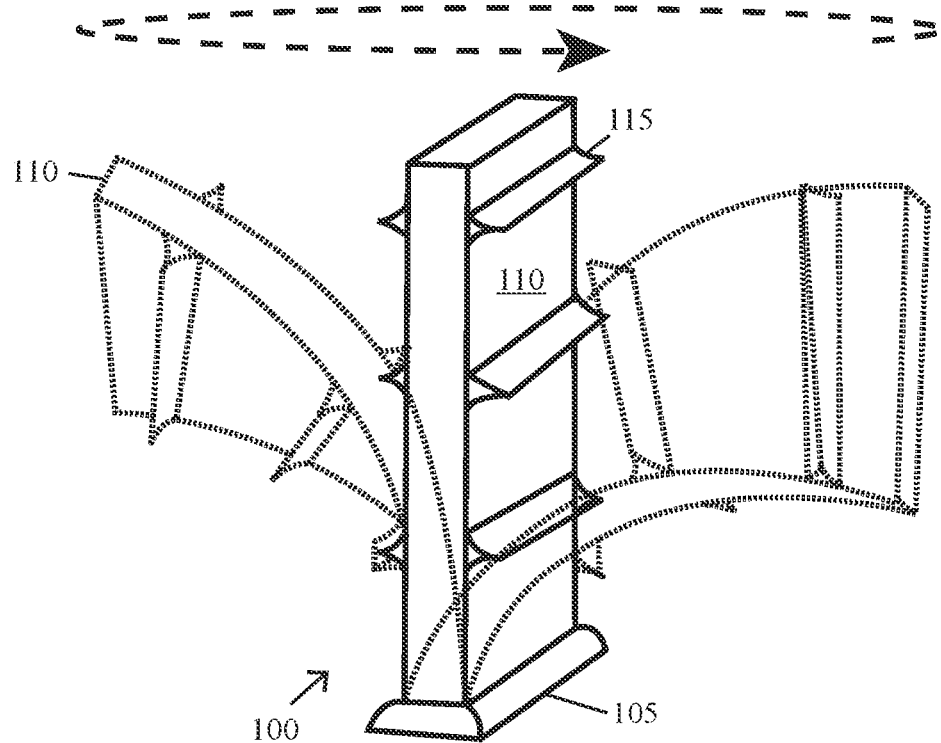

The flexible wave energy converter as described herein may be operated in a variety of ocean environments. The flexible wave energy converter as described herein converts surging ocean wave forces into electricity via dielectric elastomer generators, dielectric ionic elastomer generators, and/or magnetostriction. Generators may be embedded throughout the flexible wave energy converter's structure; as the flexible wave energy converter undergoes dynamic strain (flexing, stretching, twisting, and distension) electricity is generated. As shown in FIGS. 1A and 1B, a flexible surging wave energy converter moves and flexes with the movement of the waves. The flexible nature of the flexible wave energy converter allows it to adjust to the elliptic nature of wave orbitals in shallower waters or the more circular wave orbitals in deeper waters. The stretching and flexing capabilities of the present disclosure may be adjusted or tailored to the specific operating ocean environment. The orientation, size, and number of generators embedded within the flexible material may be tailored to the specific wave environment where the flexible wave energy converter will be operated.

As used herein, "embedded" means situated as an integral part of the device. For example, in some embodiments, the elastomer generators may be embedded in a surrounding mass, meaning they are fixed in a surrounding mass or implanted into that mass. In other embodiments. elastomer generators may be embedded within a flexible material or are surrounded by the flexible material such that they are deformed or contorted as the flexible material is deformed or contorted.

FIGS. 1A and 1B illustrate a flexible wave energy converter according to some embodiments of the present disclosure. FIG. 1A shows the flexible wave energy converter moving laterally, while FIG. 1B shows the flexible wave energy converter moving rotationally. The flexible wave energy converter 100 includes a base 105, a body 110, and fins 115. The base 105 stays immobile as the body 110 and fins 115 are moved by waves and currents. FIG. 1A shows how the body 110 and fins 115 may be moved by waves and currents in a lateral movement, and FIG. 1B shows how the body 110 and fins 115 may be moved by waves and currents in a rotational or angular way. The conversion of wave energy to electricity by the flexible wave energy converter 100 is the same process regardless of how the body 110 and fins 115 are moved. In some instances, the movement of body 110 and fins 115 may be both lateral and rotational simultaneously. The base 105 keeps the flexible wave energy converter 100 connected to either the ocean floor or another stable surface. The fins 115 may facilitate the curving and twisting of the body 110 by catching currents.

FIGS. 1A and 1B show how a flexible wave energy converter 100 can bend, twist, rotate, and/or contort with the deformation of a flexible structure. The flexible wave energy converter 100 may be formed of (or otherwise include) many small interconnected power take-off units in the form of layered/arranged dielectric elastomer generators (as shown in detail in FIG. 2). The flexible wave energy converter 100 is made of a plurality of dielectric elastomer generators (shown in FIG. 2) and elastic polymers, and the piezoelectric effect of the dielectric elastomer generators results in the generation of an electric charge from the mechanical stress applied by the waves/currents to the flexible wave energy converter 100. In some embodiments, the plurality of elastomer generators may be implanted within a flexible material, such as a synthetic polymer. The flexible nature of the flexible wave energy converter 100 allows for it to contort with the wave activity, making it both durable to extreme conditions and capable of converting wave energy into electrical energy in any circumstance where the waves or current are in motion. In some embodiments, a protective layer or barrier may encompass all or part of the flexible wave energy converter 100 to protect the elastomer generators from the ocean.

Figure 2:
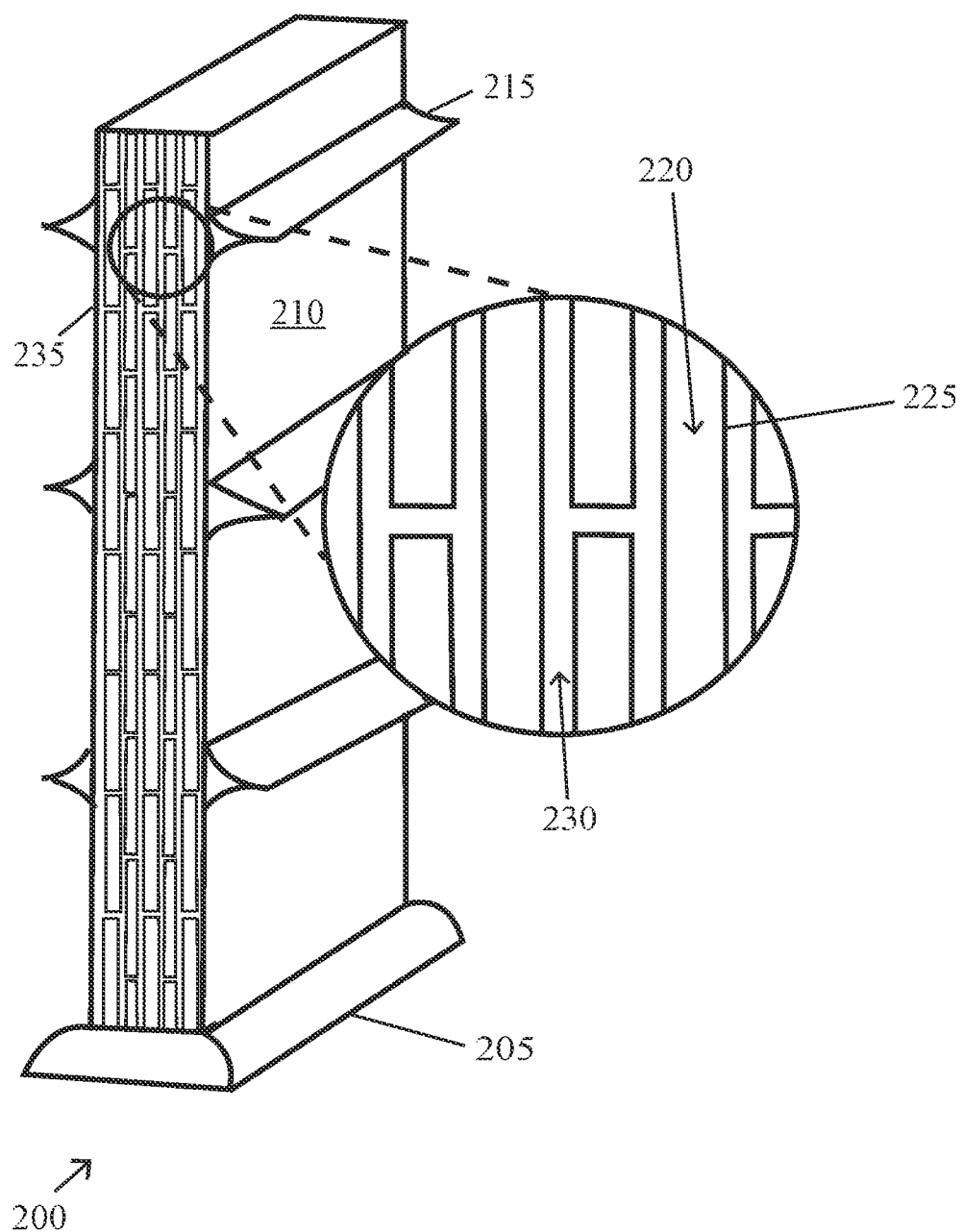
FIG. 2 illustrates a cross sectional side view of a flexible wave energy converter according to some embodiments of the present disclosure.

FIG. 2 illustrates a cross sectional side view of a flexible wave energy converter 200 according to some embodiments of the present disclosure. The flexible wave energy converter 200 is similar to the flexible wave energy converter 100 of FIGS. 1A and 1B, and includes a base 205, a body 210, and fins 215 (similar to base 105, body 110, and fins 115 of flexible wave energy converter 100). The flexible wave energy converter 200 also includes a flexible skin 235. The flexible skin 235 may be a synthetic polymer meshed with or reinforced by composites, such as. neoprene, fiberglass, polyurethane, Buna-N, rubber, and/or other similar material. The cross-sectional side view shows ionic dielectric elastomer generators 220, interstitial reinforcements 225, and layered reinforced dielectric elastomer generators 230. Other combinations of dielectric elastomer generators may be used. Dielectric elastomer generators use stretchable electrodes that are not an electrolyte, such as grease. Ionic dielectric elastomer generators typically will use an electrolyte as an electrode. In some embodiments the ionic dielectric elastomer generators 220 may be layered using reinforcements or support structures, such as carbon fiber. The ionic dielectric elastomer generators 220 may be under dynamic strain due to ocean waves and/or currents. As the flexible wave energy converter 200 is moved laterally and/or rotationally (as shown in FIGS. 1A and 1B), the ionic dielectric elastomer generators 220 may be stretched and/or compressed from their initial relaxed state. The interstitial reinforcements 225 may be support structures made of fiberglass, magnetostrictive materials/harvesters, carbon fiber, or other materials capable of providing support to the ionic dielectric elastomer generators 220 and layered reinforced dielectric elastomer generators 230 but also capable of bending and moving with the flexible skin 235. The layered reinforced dielectric elastomer generators 230 and the ionic dielectric elastomer generators 220 are stretched and/or compressed by dynamic strain applied by ocean waves/currents to the flexible wave energy converter 200. The dynamic strain from the ocean waves on the flexible wave energy converter 200 causes the body 210 to rotate and/or move laterally (as shown in FIGS. 1A and 1B) results in a change in ionic dielectric elastomer generators 220 and the layered reinforced dielectric elastomer generators 230 (as they are either stretched or compressed), resulting in the generation of an electrical current. The ionic dielectric elastomer generators 220 and the layered reinforced dielectric elastomer generators 230 may include power electronics capable of high voltages (such as greater than 1 kV) and may pre-charge the electro-active polymers of the body 210 and may include buck-boost converters, fly back transformers, or other similar systems.

In some embodiments, the ionic dielectric elastomer generators 220 and layered reinforced dielectric elastomer generators 230 may be embedded energy converters with power take-off schemes based upon a dynamically stretched capacitor. The ionic dielectric elastomer generators 220 and layered reinforced dielectric elastomer generators 230 generate electricity through stretch-pre-charge-relax-discharge cycles that dampen the deformations of their individual components. They can also act as actuators by applying a voltage potential across their dielectric elastomers. The ionic dielectric elastomer generators 220 and the layered reinforced dielectric elastomer generators 230 are embedded within a flexible material in the body 210, allowing them to work in concert to alter and adapt the flexible wave energy converter's 200 shape and store and move electric charges throughout the flexible wave energy converter 200 thereby forgoing a constant need to develop pre-charge voltages in order for the flexible wave energy converter 200 to generate electricity. The ionic dielectric elastomer generators 220 and the layered reinforced dielectric elastomer generators 230 may be distributed throughout the flexible wave energy converter 200 in various configurations, allowing the ability/resolution of the shape of the flexible wave energy converter 200.

FIGS. 1A, 1B, and 2 show examples of bottom-mounted flexible wave energy converters that can bend, twist, and contort per the deformation of a flexible structure (i.e., the body 110 and 210). The bodies 110 and 210 are made of many small interconnected power take-off units in the form of layered/arranged dielectric elastomer generators. The elastomer generators may be layered together to create a flexible structure (as shown in FIG. 2) and/or may be embedded within a flexible material, such as rubber, neoprene, or other synthetic polymer. Some embodiments may include both a flexible structure made of layers of elastomer generators and an inert material with elastomer generators embedded in the material.

In some embodiments, the flexible wave energy converter may utilize magnetostrictive rods as generators embedded within a flexible material. A flexing rods wave energy converter, as described in some embodiments, converts wave energy into electrical energy through the dynamic straining of these magnetostrictive rods. When magnetostrictive material in the form of elongated rods undergoes flexing, bending, and/or stretching (such as that caused by ocean wave loads) changing magnetic fields are generated. Through Faraday's Law of Induction, the changing magnetic fields will generate electromotive forces within conducting coils that are wrapped around, but not directly touching, the magnetostrictive rods.

Figure 3:
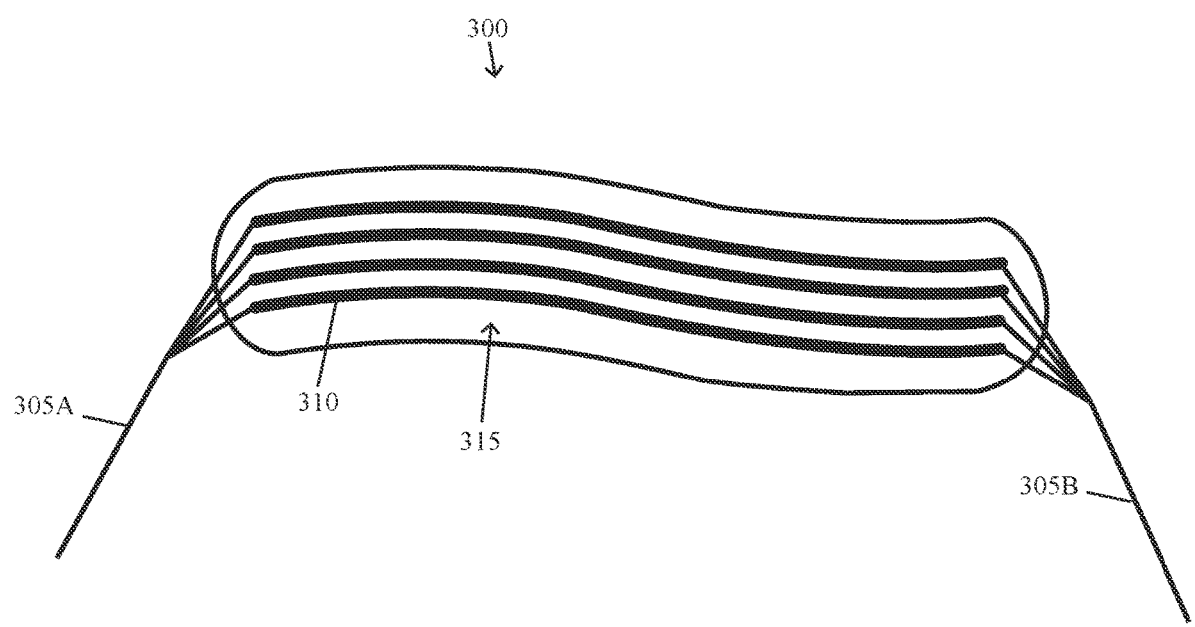
FIG. 3 illustrates a flexing rods wave energy converter according to some embodiments of the present disclosure.

FIG. 3 illustrates a flexing rods wave energy converter 300 according to some embodiments of the present disclosure. The flexing rods wave energy converter 300 includes at least one magnetostrictive rod 310 enclosed within a tube 315 and attached to a solid surface by at least one mooring line (shown as mooring lines 305A and 305B). The magnetostrictive rods 310 dynamically strain due to external loads relative to coiled conductors (not shown in FIG. 3) attached to tube 315. The dynamic straining of magnetostrictive material, within a conductor, generates electricity. In some embodiments, there may be multiple magnetostrictive rods 310 within the tube 315. The tube 315 may be a buoyant casing of closed cell rubber, foam, and/or a similar material. The mooring lines 305A and 305B may be attached to one or both ends of the magnetostrictive rods 310, facilitating dynamic straining. In some embodiments, the tube 315 may be at or near the ocean surface. In other embodiments the tube 315 may be submerged and suspended underneath the ocean surface.

Figure 4:
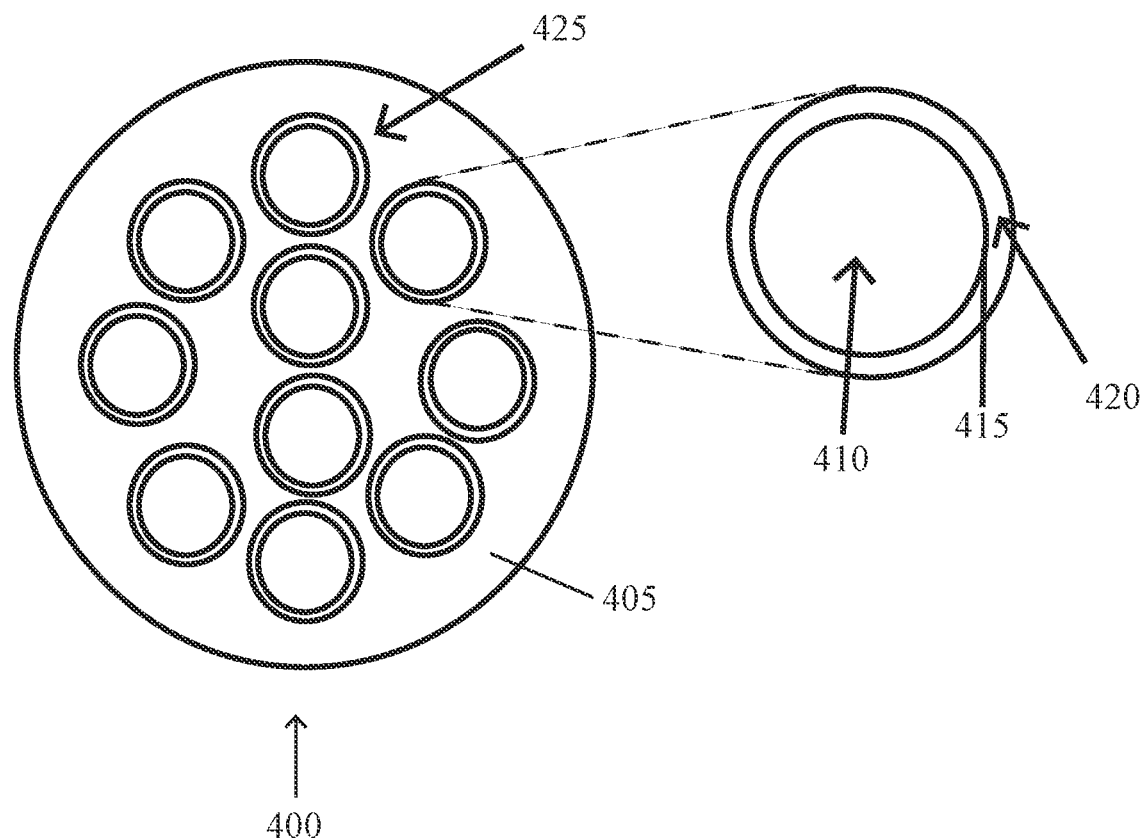
FIG. 4 illustrates a cross sectional view of a flexing rods wave energy converter with a pop-out view of a single magnetostriction rod/generator according to some embodiments of the present disclosure.

FIG. 4 illustrates a cross section of a flexing rods wave energy converter with a pop-out view of a single magnetostriction rod/generator according to some embodiments of the present disclosure. The cross section of the flexing rods wave energy converter 400 shows a filler material 405, which may be closed cell foam, rubber, a solid closed cell foam-rubber-composite, or another conductive and buoyant material. The components of the magnetostrictive rods 425 are shown in detail the magnetostrictive material 410 is encased in a barrier 415 and a conducting coil 420. The barrier 415 may be a neutral material such as fiberglass and/or Teflon.

Figure 5:
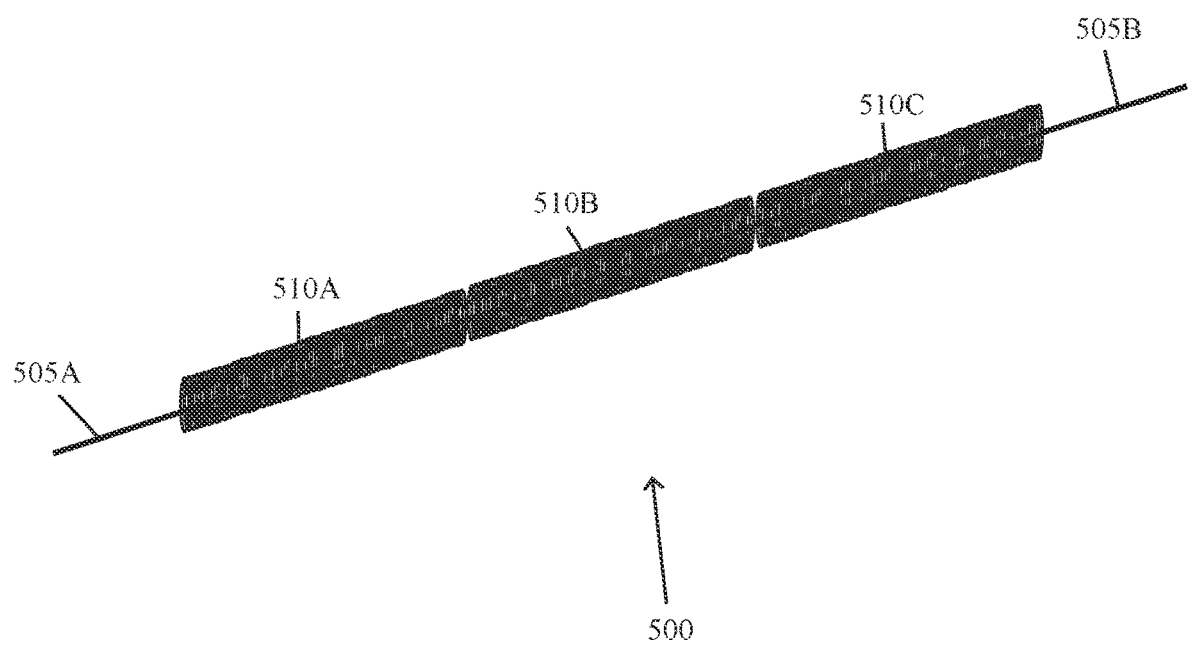
FIG. 5 illustrates a single exemplary magnetostrictive rod within a flexing rods wave energy converter according to some embodiments of the present disclosure.

FIG. 5 illustrates a single exemplary magnetostrictive rod within a flexing rods wave energy converter according to some embodiments of the present disclosure. The magnetostrictive rod 500 (similar to magnetostrictive rods 310 of FIG. 3 and 425 of FIG. 4) is attached at one end to mooring line 505A and at the other end to mooring line 505B. The magnetostrictive rod 500 is made up of concentric segmented coils 510A, 510B, and 510C. Each segmented coil 510A, 510B, and 510C is made of the parts shown in detail in FIG. 4. Having multiple segmented coils 510A, 510B, and 510C allows for the flexing rods wave energy converter to have active control of strain at distinctive sections. It also provides redundancy. As shown in FIGS. 3, 4, and 5, the magnetostrictive rods are stretched relative to the coils, thereby generating electricity through the mechanism of magnetostriction generators.

As shown in FIGS. 3 and 4, the flexing rods wave energy converter 400 leverages multiple magnetostrictive rods directly embedded within a solid material. In some embodiments, the solid material in which the magnetostrictive rods are embedded (i.e., the tube 315) may be closed cell foam. In some embodiments, the tube 315 may be buoyant. In some embodiments, the tube 315 may be cylindrical in shape.

In some embodiments, the magnetostrictive rods 310 may flex back and forth (i.e., dynamically strain) due to external loads (e.g., ocean waves, moorings, etc.) and do so relative to conducting coils 420 enclosed within a tube 315. The dynamic straining of magnetostrictive material, within a conductor, is how the flexing rods wave energy converter generates electricity from the wave energy. As shown in FIGS. 3 and 5, mooring lines may be attached directly to magnetostrictive rods facilitating dynamic straining. The magnetostrictive rods may be made of magnetostrictive materials, such as Terfenol-D and/or Galfenol.

In some embodiments, the flexing rods wave energy converter 400 encases its magnetostrictive rods within a solid closed cell foam rubber-composite cylinder that floats atop the ocean surface. In other embodiments, the flexing rods wave energy converter is suspended underneath the ocean surface. As shown in FIG. 4, separating the magnetostrictive material 410 (which makes up the magnetostrictive rods 425) from the filler material 405 is a thin wall barrier 415 (e.g., fiberglass, Teflon, etc.) such that the rods may flex, bend, and stretch relative to the conducting coils 420. In some embodiments, the conducting coils 420 may be affixed to (and therefore move with) the filler material 405 via mooring lines 305A/305B. The conducting coils 420 may be made of conducting materials, preferably conducting metals, such as copper. The relative motion between the rods 310 and the tube 315 is minor when compared to the converter's overall length (e.g., a short strain deformation of a rod relative to a long converter). Mooring lines may be attached to either the floating cylinder or directly to the magnetostrictive rods. If mooring lines are not attached to the magnetostrictive rods directly, the magnetostrictive rods may be attached to the floating cylinder so the rods move with the cylinder.

Segmented coils may be wrapped along the lengths of magnetostrictive rods allows for redundant electric power generation (i.e., a distributed power take-off system) and active control of the converter's dynamics (i.e., altering the stiffness of an individual rod segment by adjusting coil electrical load). Redundancy from segmented coils means even if some coils fail, other coils will continue to generate electricity. Active control of the converter means that the actual process of converting ocean wave energy into electricity is tuned, in real time, along distinct segments of any rod such that the conversion process is optimized per changing ocean wave environment.

FIG. 5 illustrates the rod's stretching relative to segmented coils. Electrical current may be induced in segmented coils 510A/510B/510C when the magnetostrictive rod (not shown in FIG. 5, it is within the segmented coils 510A/510B/510C) is dynamically strained. The segmented coils 510A/510B/510C along the rod allow active control of strain at distinctive sections and also provides redundancy. The magnetostrictive rod stretches relative to coils thereby generating electricity from wave energy through magnetostriction. When the flexing rods wave energy generator 500 is under strain (such as when the magnetostrictive rods are being flexed) magnetic domains within the flexing rods wave energy converter 500 reorient and create an altered magnetic field. A changing magnetic field will induce electrical current in the conductor (e.g., the copper coil wrapped around the rod).

Figure 6:
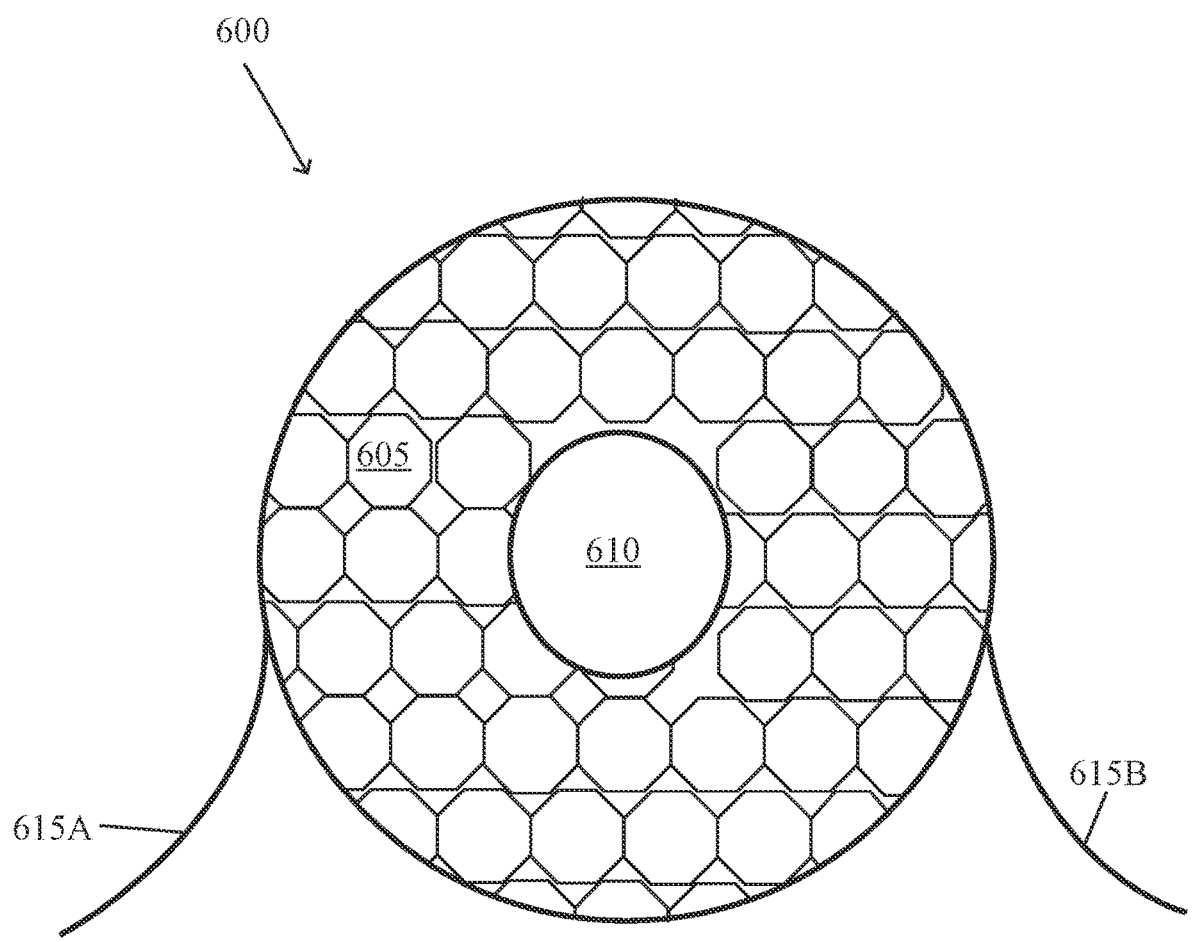
FIG. 6 illustrates a flexible point absorber wave energy converter as described by some embodiments herein.
Figure 7:
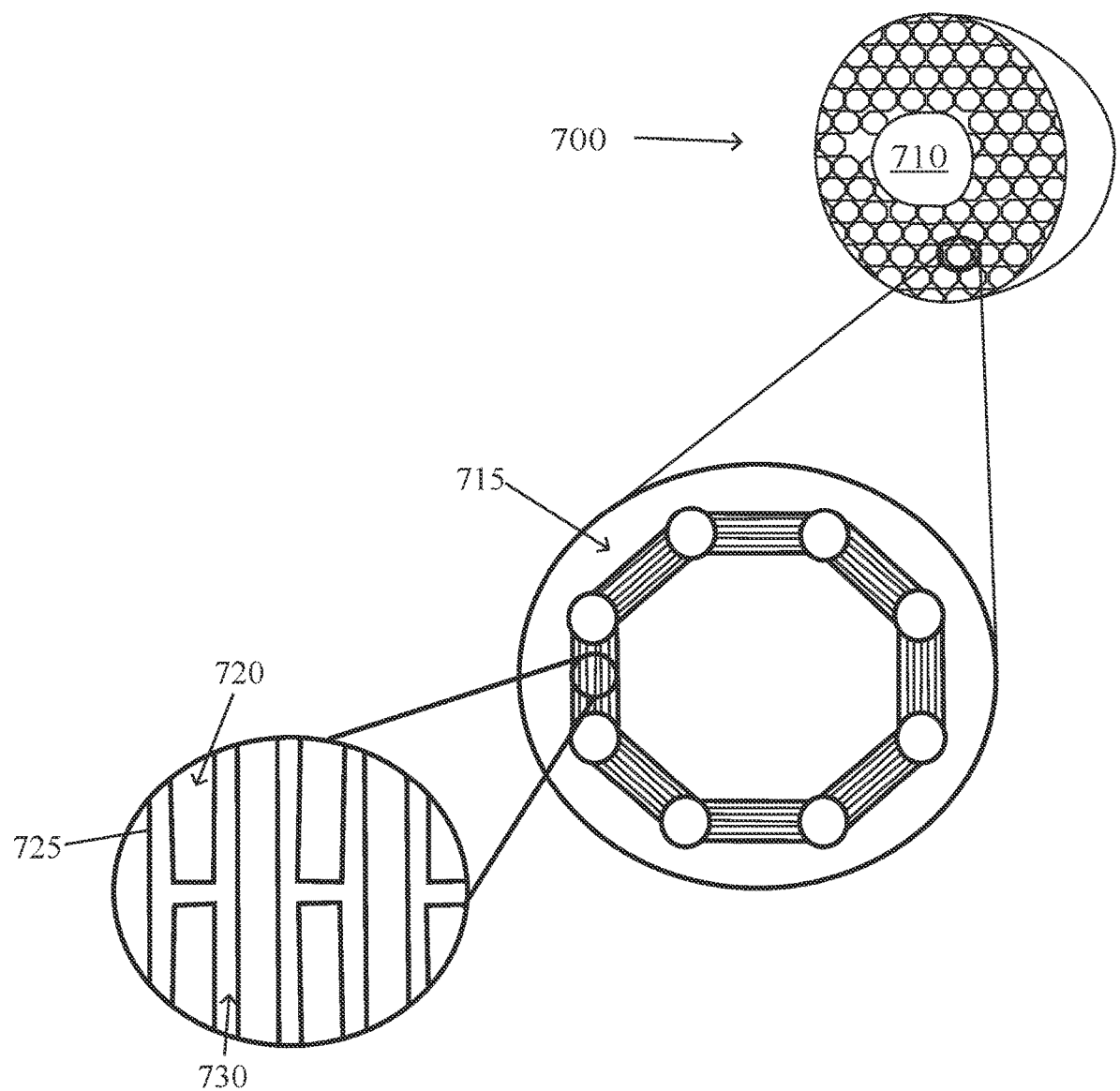
FIG. 7 illustrates a cross sectional view of a flexing rods wave energy converter with a pop-out view of a single polygon of generators according to some embodiments of the present disclosure.

In some embodiments, the flexible wave energy converter utilizes a flexible material embedded with generators surrounding a solid mass. FIG. 6 illustrates a flexible point absorber wave energy converter 600 as described by some embodiments herein. As shown in FIG. 6, embedded through the hull 605 are discretized flexible generators. At the center of the hull 605 is a mass 610. The flexible hull 605 is attached to mooring lines 615A and 615B As forces exerted by mooring lines 615A and 615B, ocean wave forces, and the inertial forces of the solid internal mass act upon the bendable/flexible hull 605, the hull's 605 internal lattice (shown in detail in FIG. 7) undergoes dynamic strain. The internal lattice may be a honeycomb structure, that is it may be made of a close packing of polyhedral cells, the polyhedral cells each made of elastomer generators (as shown in FIG. 7). The flexible generators embedded within the hull's 605 lattice convert portions of the dynamic strain energy (structural flexing, stretching, etc.) into electricity. The generators may be dielectric elastomer generators, ionic dielectric elastomer generators, magnetostrictive generators, and/or a combination of flexible generators. The flexible point absorber wave energy converter's 600 underlying structure enables flexibility while also being sufficiently robust to endure ocean environments. The hull 605 may be comprised of any number of synthetic polymers meshed or reinforced by composites, such as neoprene, fiberglass, polyurethane, Buna-N, rubber, etc. The mass 610 may be a solid or semi-solid object, which acts as an inertial tensor to the hull 605 compressing and stretching the elastomer generators which comprise the hull 605. The mass 610 may be made of rubber, aluminum, concrete, plastic, or other material. The material of the mass 610 may be selected based on the material of the hull 605 and the ocean environment in which the point absorber wave energy converter 600 will be operated.

In some embodiments, the flexible point absorber wave energy converter 600 has mooring lines 615A and 615B connected to the flexible hull 605. In this embodiment, the "pull" of the mooring lines 615A and 615B may alter the shape of the hull 605, resulting in energy generation.

In some embodiments, the mooring lines 615A and 615B (or a single mooring line) may be connected to the mass 610 situated within the flexible hull 605. In this embodiment, the "pull" of the mooring lines will "pull" on the mass 610 and thus alter the shape of the hull 605, resulting in energy generation.

The lattice structure may be composed of dielectric elastomer generators, ionic dielectric elastomer generators, and/or magnetostrictive fibers, which may generate electricity when undergoing the dynamic strain induced by external forces.

FIG. 7 illustrates a cross section of a flexing rods wave energy converter with a pop-out view of a single polygon of generators according to some embodiments of the present disclosure. The flexible point absorber wave energy converter 700 is made up of a hull 705 which surrounds a solid mass 710. The pop-out shows a single polygon 715 (in this example, an octagon shape because the lattice is shown as a honeycomb) which is made up of multiple generators. A single polygon 715 is made up of ionic dielectric elastomer generators 720, interstitial reinforcements 725, and layered reinforced dielectric elastomer generators 730.

As shown in FIG. 7, the flexible hull 705 is flexible and malleable, allowing it to contort as it is hit with ocean waves and/or current and it contains generators. In some embodiments, the flexible point absorber wave energy converter 700 may be spheroid device floating atop the ocean's surface. In other embodiments, the flexible point absorber wave energy converter 700 may be operated underneath the ocean's surface. Ocean wave and/or current loads flex, squeeze, and contort the hull 705 as it subjected to undulating motions. The sold mass 710 moves inside the hull 705, also flexing, squeezing, and contorting the hull 705 (and acting as an inertial mass). The hull 705 is made up of a plurality of elastomer generators (ionic dielectric elastomer generators 720 and layered reinforced dielectric elastomer generators 730), each embedded within the hull 705, and capable of moving with the flexible structure of the hull 705 as it is subjected to stress from waves and/or currents.

During energy generation, the solid mass 710 compresses and/or stretches the honeycomb cells (i.e., the plethora of single polygon 715 contained within the hull 705) thereby dynamically straining them and allowing the elastomer generators comprising the single polygon 715 to convert such strain energy into electrical energy. The plethora of single polygons 715 contained within the flexible hull 705 are made from a layered-interconnected combination of dielectric elastomer generators reinforced by magnetostrictive fibers or carbon fibers. As shown in the pop-out, a single polygon 715 is made up of a combination of ionic dielectric elastomer generators 720 and layered reinforced dielectric elastomer generators 730 which are both supported by interstitial reinforcements 725. Dynamic straining of the dielectric elastomer generators causes electricity to be generated.

The present disclosure provides systems, devices, and methods for flexible wave energy converters using various means. In some embodiments, the flexible wave energy converters may include elastomer generators embedded in or making up the wave energy converters, which generate electricity via the piezoelectric effect when flexed. In some embodiments, the flexible wave energy converters may use magnetostrictive materials, such as magnetostrictive rods that, when fixed, generate electricity in conductive coils via electromagnetism.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

The invention claimed is:

1. An ocean wave energy converter device comprising:
    a hull having an interior and an exterior;
    a lattice comprising a honeycomb structure and positioned in the interior; and
    a mass located in the interior; wherein:
    the hull is substantially spherical,
    the honeycomb structure comprises elastomer generators and magnetostrictive fibers arranged in a plurality of octagons,
    the mass comprises a solid spherical object and is surrounded by the lattice and in contact with the lattice,
    the mass is configured to apply a strain to the lattice when the device is subjected to a stress from a wave, and
    the strain on the lattice results in a generation of electrical energy.

2. The device of claim 1, wherein the elastomer generators comprises:
    an ionic dielectric elastomer generator;
    a layered reinforced dielectric elastomer generator; and
    a structural reinforcement; wherein:
    the structural reinforcement has a first surface and a second surface,
    the ionic dielectric elastomer generator is in contact with the first surface, and
    the layered reinforced dielectric elastomer generator is in contact with the second surface.

3. The device of claim 1, wherein:
    the stress results in the hull being deformed.

4. The device of claim 1, further comprising:
    a mooring line attached to the exterior; wherein:
    the mooring line is configured to apply the stress to the device as a result of ocean wave forces.

5. The device of claim 4, wherein:
    the stress results in the hull being deformed.

6. The device of claim 1, wherein:
    the hull is comprised of a synthetic polymer.

7. The device of claim 6, wherein:
    the synthetic polymer comprises at least one of neoprene, fiberglass, polyurethane, or rubber.

8. The device of claim 1, wherein:
    the mass comprises at least one of rubber, aluminum, concrete, or plastic.

* * * * *